United States Patent [19]

Gilbert et al.

[11] Patent Number: 5,450,313
[45] Date of Patent: Sep. 12, 1995

[54] GENERATING LOCAL ADDRESSES AND COMMUNICATION SETS FOR DATA-PARALLEL PROGRAMS

[75] Inventors: John R. Gilbert, Palo Alto, Calif.; Shang-Hua Teng, Minneapolis, Minn.; Robert S. Schreiber, Palo Alto, Calif.; Siddhartha Chatterjee, Chapel Hill, N.C.; Fred J. E. Long, San Diego, Calif.

[73] Assignee: Xerox Corporation, Stamford, Conn.

[21] Appl. No.: 217,404

[22] Filed: Mar. 24, 1994

[51] Int. Cl.⁶ .............................................. G06F 15/16
[52] U.S. Cl. ..................... 364/133; 395/700; 395/497.01; 395/412
[58] Field of Search ............... 364/133; 395/425, 700, 395/400

[56] References Cited

U.S. PATENT DOCUMENTS

| | | | |
|---|---|---|---|
| 4,833,599 | 5/1989 | Colwell et al. | 395/650 |
| 5,021,947 | 6/1991 | Campbell et al. | 395/800 |
| 5,093,916 | 3/1992 | Karp et al. | 395/700 |
| 5,293,631 | 3/1994 | Rau et al. | 395/700 |
| 5,355,492 | 10/1994 | Frankel et al. | 395/700 |
| 5,355,494 | 10/1994 | Sistare et al. | 395/700 |

*Primary Examiner*—Paul P. Gordon

[57] ABSTRACT

An optimizing compilation process generates executable code which defines the computation and communication actions that are to be taken by each individual processor of a computer having a distributed memory, parallel processor architecture to run a program written in a data-parallel language. To this end, local memory layouts of the one-dimensional and multidimensional arrays that are used in the program are derived from one-level and two-level data mappings consisting of alignment and distribution, so that array elements are laid out in canonical order and local memory space is conserved. Executable code then is generated to produce at program run time, a set of tables for each individual processor for each computation requiring access to a regular section of an array, so that the entries of these tables specify the spacing between successive elements of said regular section resident in the local memory of said processor, and so that all the elements of said regular section can be located in a single pass through local memory using said tables. Further executable code is generated to produce at program run time, another set of tables for each individual processor for each communication action requiring a given processor to transfer array data to another processor, so that the entries of these tables specify the identity of a destination processor to which the array data must be transferred and the location in said destination processor's local memory at which the array data must be stored, and so that all of said array data can be located in a single pass through local memory using these communication tables. And, executable node code is generated for each individual processor that uses the foregoing tables at program run time to perform the necessary computation and communication actions on each individual processor of the parallel computer.

5 Claims, 17 Drawing Sheets

| Course | Processor 0 | | | Processor 1 | | | ... | Processor p - 1 | | |
|---|---|---|---|---|---|---|---|---|---|---|
| 0 | 0 | ... | $k$-1 | $k$ | ... | $2k$-1 | ... | $(p$-$1)k$ | ... | $pk$-1 |
| 1 | $pk$ | ... | $(p+1)k$-1 | $(p+1)k$ | ... | $(p+2)k$-1 | ... | $(2p$-$1)k$ | ... | $2pk$-1 |
| ⋮ | ⋮ | ⋮ | ⋮ | ⋮ | ⋮ | ⋮ | ⋮ | ⋮ | ⋮ | ⋮ |
| Offset | 0 | ... | $k$-1 | 0 | ... | $k$-1 | ... | 0 | ... | $k$-1 |

Fig. 4

| Local memory location | 0 | ... | $k$-1 | $k$ | ... | $2k$-1 | ... |
|---|---|---|---|---|---|---|---|
| Array index (processor 0) | 0 | ... | $k$-1 | $pk$ | ... | $(p+1)k$-1 | ... |
| Array index (processor 1) | $k$ | ... | $2k$-1 | $(p+1)k$ | ... | $(p+2)k$-1 | ... |
| Array index (processor $p$-1) | $(p$-$1)k$ | ... | $pk$-1 | $(2p$-$1)k$ | ... | $2pk$-1 | ... |

Fig. 5

| Proc. 0 | | | | Proc. 1 | | | | Proc. 2 | | | | Proc. 3 | | | |
|---|---|---|---|---|---|---|---|---|---|---|---|---|---|---|---|
| |0| | 1 | 2 | |3| | 4 | 5 | |6| | 7 | 8 | |9| | 10 | 11 | |12| | 13 | 14 | |15| |
| 16 | 17 | |18| | 19 | 20 | |21| | 22 | 23 | |24| | 25 | 26 | |27| | 28 | 29 | |30| | 31 |
| 32 | |33| | 34 | 35 | |36| | 37 | 38 | |39| | 40 | 41 | |42| | 43 | 44 | |45| | 46 | 47 |

*Fig. 6*

| Proc. 0 | | | | Proc. 1 | | | | Proc. 2 | | | |
|---|---|---|---|---|---|---|---|---|---|---|---|
| |0| | 1 | 2 | |3| | 4 | 5 | |6| | 7 | 8 | |9| | 10 | 11 |
| |12| | 13 | 14 | |15| | 16 | 17 | |18| | 19 | 20 | |21| | 22 | 23 |

*Fig. 9*

| Proc. 0 | | | | Proc. 1 | | | | Proc. 2 | | | |
|---|---|---|---|---|---|---|---|---|---|---|---|
| |0| | 1 | 2 | 3 | 4 | |5| | 6 | 7 | 8 | 9 | |10| | 11 |
| 12 | 13 | 14 | |15| | 16 | 17 | 18 | 19 | |20| | 21 | 22 | 23 |
| 24 | |25| | 26 | 27 | 28 | 29 | |30| | 31 | 32 | 33 | 34 | |35| |
| 36 | 37 | 38 | 39 | |40| | 41 | 42 | 43 | 44 | |45| | 46 | 47 |
| 48 | 49 | |50| | 51 | 52 | 53 | 54 | |55| | 56 | 57 | 58 | 59 |

*Fig. 12*

| STATE | NEXT | $\Delta\mathcal{M}$ | $\Delta\mathcal{C}$ | $\Delta\mathcal{O}$ |
|---|---|---|---|---|
| 0 | 3 | 3 | 0 | 3 |
| 1 | 0 | 3 | 1 | -1 |
| 2 | 1 | 3 | 1 | -1 |
| 3 | 2 | 3 | 1 | -1 |

| STATE | NEXT | $\Delta M$ | $\Delta C$ | $\Delta O$ |
|---|---|---|---|---|
| 0 | 3 | 3 | 0 | 3 |
| 1 | 1 | 4 | 1 | 0 |
| 2 | 2 | 4 | 1 | 0 |
| 3 | 0 | 1 | 1 | -3 |

| STATE | NEXT | $\Delta\mathcal{M}$ | $\Delta\mathcal{C}$ | $\Delta\mathcal{O}$ |
|---|---|---|---|---|
| 0 | 3 | 7 | 1 | 3 |
| 1 | 2 | 9 | 2 | 1 |
| 2 | 0 | 2 | 1 | -2 |
| 3 | 1 | 2 | 1 | -2 |

Algorithm 1 (Memory access sequence for a one-level mapping.)
*Input:* Layout parameters $(p, k)$, regular section $A(\ell : h : s)$, processor number $m$.
*Output:* The $\Delta \mathcal{M}$ table, the length of the table, starting memory location, ending memory location, and $\sum \Delta \mathcal{M}$ for processor $m$.
*Method:*

1  integer $\Delta \mathcal{M}[k]$, *length*
2  integer $\lambda$, *i, start, end, d*, $\alpha$, $\beta$, *lcourse, loffset, course, offset*
3  integer *loc[k+1], sorted[k+1]*

4  $(d, \alpha, \beta) \leftarrow$ EXTENDED-EUCLID$(s, pk)$; *length* $\leftarrow 0$; *start*
    $\leftarrow h + 1$; *end* $\leftarrow \ell - 1$
5  for $\lambda = km - \ell$ to $km - \ell + k - 1$ do
6     if $\lambda \bmod d = 0$ then         /* Solvable equation */
7        *loc[length]* $\leftarrow \ell + \frac{s}{d}(\lambda \alpha + pk \lceil \frac{-\lambda \alpha}{pk} \rceil)$
8        *start* $\leftarrow \min(start, loc[length])$
9        *end* $\leftarrow \max(end, \ell + \frac{s}{d}(\lambda \alpha + pk \lfloor \frac{(h-l)d - \lambda \alpha s}{pks} \rfloor))$
10       *length* $\leftarrow$ *length* $+ 1$
11    endif
12 enddo
13 if *length* $= 0$ or *start* $> h$ then
14    return $\Delta \mathcal{M}, \perp, \perp, \perp, \perp$     /* No work for processor */
15 endif
16 *sorted* $\leftarrow$ SORT *(loc, length)*
17 *sorted[length]* $\leftarrow$ *sorted[0]* $+ pks/d$; *lcourse* $\leftarrow \mathcal{C}(sorted[0]; p, k)$; *loffset* $\leftarrow \mathcal{O}(sorted[0]; p, k)$
18 for $i = 0$ to *length* $- 1$ do
19    *course* $\leftarrow \mathcal{C}(sorted[i+1]; p, k)$; *offset* $\leftarrow \mathcal{O}(sorted[i+1]; p, k)$
20    $\Delta \mathcal{M}[i] \leftarrow k \cdot (course - lcourse) + (offset - loffset)$
21    *lcourse* $\leftarrow$ *course*; *loffset* $\leftarrow$ *offset*
22 enddo
23 return $\Delta \mathcal{M}$, *length*, $\mathcal{M}(start; p, k)$, $\mathcal{M}(end; p, k)$,
    $sk/$GCD$(s, pk)$

*Fig.15*

```
real A(0:42)
template T
align A(i) with T(3*i)
distribute T cyclic(4) onto 4 procs

| Processor 0 | | | | Processor 1 | | | | Processor 2 | | | | Processor 3 | | | |
|---|---|---|---|---|---|---|---|---|---|---|---|---|---|---|---|
| 0 | | | 1 | | | 2 | | | 3 | | | 4 | | | 5 |
| | | 6 | | | 7 | | | 8 | | | 9 | | | 10 | |
| | 11 | | | 12 | | | 13 | | | 14 | | | 15 | | |
| 16 | | | 17 | | | 18 | | | 19 | | | 20 | | | 21 |
| | | 22 | | | 23 | | | 24 | | | 25 | | | 26 | |
| | 27 | | | 28 | | | 29 | | | 30 | | | 31 | | |
| 32 | | | 33 | | | 34 | | | 35 | | | 36 | | | 37 |
| | | 38 | | | 39 | | | 40 | | | 41 | | | 42 | |

*Fig.17*

| Local memory location | 0 | 1 | 2 | 3 | 4 | 5 | 6 | 7 | 8 | 9 | 10 |
|---|---|---|---|---|---|---|---|---|---|---|---|
| Processor 0 | 0 | 1 | 6 | 11 | 16 | 17 | 22 | 27 | 32 | 33 | 38 |
| Processor 1 | 2 | 7 | 12 | 13 | 18 | 23 | 28 | 29 | 34 | 39 | |
| Processor 2 | 3 | 8 | 9 | 14 | 19 | 24 | 25 | 30 | 35 | 40 | 41 |
| Processor 3 | 4 | 5 | 10 | 15 | 20 | 21 | 26 | 31 | 36 | 37 | 42 |

*Fig.18*

| Local template cell | 0 | 1 | 2 | 3 | 4 | 5 | 6 | 7 | 8 | 9 | 10 | 11 | ... |
|---|---|---|---|---|---|---|---|---|---|---|---|---|---|
| Processor 0 | 0 |   |   | 1 |   |   | 6 |   |   | 11 |   |   | ... |
| Processor 1 |   |   | 2 |   |   | 7 |   |   | 12 |   |   | 13 | ... |
| Processor 2 |   | 3 |   |   | 8 |   |   | 9 |   |   | 14 |   | ... |
| Processor 3 | 4 |   |   | 5 |   |   | 10 |   |   | 15 |   |   | ... |

*Fig.19*

| Processor (0,0) | | | | Processor (0,1) | | | |
|---|---|---|---|---|---|---|---|
| (0,0) | (0,1) | (0,4) | (0,5) | (0,2) | (0,3) | (0,6) | (0,7) |
| (1,0) | (1,1) | (1,4) | (1,5) | (1,2) | (1,3) | (1,6) | (1,7) |
| (2,0) | (2,1) | (2,4) | (2,5) | (2,2) | (2,3) | (2,6) | (2,7) |
| (9,0) | (9,1) | (9,4) | (9,5) | (9,2) | (9,3) | (9,6) | (9,7) |
| (10,0) | (10,1) | (10,4) | (10,5) | (10,2) | (10,3) | (10,6) | (10,7) |
| (11,0) | (11,1) | (11,4) | (11,5) | (11,2) | (11,3) | (11,6) | (11,7) |
| Processor (1,0) | | | | Processor (1,1) | | | |
| (3,0) | (3,1) | (3,4) | (3,5) | (3,2) | (3,3) | (3,6) | (3,7) |
| (4,0) | (4,1) | (4,4) | (4,5) | (4,2) | (4,3) | (4,6) | (4,7) |
| (5,0) | (5,1) | (5,4) | (5,5) | (5,2) | (5,3) | (5,6) | (5,7) |
| (12,0) | (12,1) | (12,4) | (12,5) | (12,2) | (12,3) | (12,6) | (12,7) |
| (13,0) | (13,1) | (13,4) | (13,5) | (13,2) | (13,3) | (13,6) | (13,7) |
| (14,0) | (14,1) | (14,4) | (14,5) | (14,2) | (14,3) | (14,6) | (14,7) |
| Processor (2,0) | | | | Processor (2,1) | | | |
| (6,0) | (6,1) | (6,4) | (6,5) | (6,2) | (6,3) | (6,6) | (6,7) |
| (7,0) | (7,1) | (7,4) | (7,5) | (7,2) | (7,3) | (7,6) | (7,7) |
| (8,0) | (8,1) | (8,4) | (8,5) | (8,2) | (8,3) | (8,6) | (8,7) |
| (15,0) | (15,1) | (15,4) | (15,5) | (15,2) | (15,3) | (15,6) | (15,7) |
| (16,0) | (16,1) | (16,4) | (16,5) | (16,2) | (16,3) | (16,6) | (16,7) |
| (17,0) | (17,1) | (17,4) | (17,5) | (17,2) | (17,3) | (17,6) | (17,7) |

*Fig.24*

Algorithm 2 (Memory access sequence for a two-level mapping.)
*Input:* Alignment parameters $(a, b)$, layout parameters $(p, k)$, array length $n$, regular section $A(\ell : h : s)$, processor number $m$.
*Output:* The $\Delta \mathcal{M}$ table, length of the table, starting memory location, ending memory location, and the length of $A$ in processor $m$.
*Method:*

1  integer $i$, $mm$, $numarcs[k]$
2  integer $\Delta \mathcal{M}[k]$, $length$, $startmem$, $lastmem$
3  integer $\Delta \mathcal{M}1[k]$, $length1$, $startmem1$, $lastmem1$, $memcycle1$
4  integer $\Delta \mathcal{M}2[k]$, $length2$, $startmem2$, $lastmem2$, $memcycle2$ 5  function $residual(x) = length1 \cdot \lfloor (x - startmem1)/memcycle1 \rfloor$
6  function $major(x) = (numarcs[x \bmod k] - numarcs[startmem1 \bmod k]) \bmod length1$
7  function $realmem(x) = major(x) + residual(x)$ 8  $(\Delta \mathcal{M}1, length1, startmem1, lastmem1, memcycle1)$
   $\leftarrow$ Algorithm1$(b, a(n - 1) + b, a, p, k, m)$
9  $(\Delta \mathcal{M}2, length2, startmem2, lastmem2, memcycle2)$
   $\leftarrow$ Algorithm1$(a\ell + b, ah + b, as, p, k, m)$
10 if $length1 = \bot$ or $length2 = \bot$ then
11     return $\Delta \mathcal{M}, \bot, \bot, \bot, 0$     /* No work for processor */
12 endif
13 $mm \leftarrow startmem1$
14 for $i = 0$ to $length1 - 1$ do
15     $numarcs[mm \bmod k] \leftarrow i$
16     $mm \leftarrow mm + \Delta \mathcal{M}1[i]$
17 enddo
18 $mm \leftarrow startmem2$
19 for $i = 0$ to $length2 - 1$ do
20     $\Delta \mathcal{M}[i] \leftarrow realmem(mm + \Delta \mathcal{M}2[i]) - realmem(mm)$
21     $mm \leftarrow mm + \Delta \mathcal{M}2[i]$
22 enddo
23 return $\Delta \mathcal{M}, length2, realmem(startmem2),$
   $realmem(lastmem2), realmem(lastmem1) - realmem(startmem1) + 1$

*Fig. 22*

```
real memory(0:10)
constant startmem = 3
constant lastmem = 10
constant length = 4
constant delta_M = [2 3 2 5]

base = startmem
i = 0
while base <= lastmem do
     memory(base) = 1
     base = base + delta_M(i)
     i = (i+1) mod length
end do
```

*Fig.23*

Algorithm 3 (Memory access sequence for a multidimensional array with a two-level mapping.)

*Input:* Number of dimensions $d$; alignment parameters $(a_j, b_j)$, layout parameters $(p_j, k_j)$, dimension length $n_j$, regular section $A(l_j : h_j : s_j)$, processor number $m_j$, for each dimension $j$ ($1 \leq j \leq d$).

*Output:* $\Delta \mathcal{M}_j$, $length_j$, $startmem_j$, $lastmem_j$ ($1 \leq j \leq d$).

*Method:*

```
1   integer j, mem, m, k 2   mem ← 1
3   for j = 1 to d do
4       (ΔM_j, length_j, startmem_j, lastmem_j, m) ← Algorithm2(a_j,
            b_j, p_j, k_j, n_j, l_j, h_j, s_j, m_j)
5       startmem_j ← startmem_j · mem
6       lastmem_j ← lastmem_j · mem
7       for k = 0 to length_j - 1 do
8           ΔM_j[k] ← ΔM_j[k] · mem
9       enddo
10      mem ← mem · m
11  enddo
12  return ΔM_j, length_j, startmem_j, lastmem_j (1 ≤ j ≤ d)
```

*Fig.25*

GENERATING LOCAL ADDRESSES AND COMMUNICATION SETS FOR DATA-PARALLEL PROGRAMS

FIELD OF THE INVENTION

This invention relates to compiling programs written in data parallel languages (sometimes referred to herein as "array parallel languages") for execution on computers having distributed memory, parallel processor architectures and, more particularly, to improved node code generators for such compilers. Even more specifically, this invention relates to the generation of the local memory address sequences and the communication sets that enable distributed memory parallel processors to operate on arrays in a data parallel fashion with each processor performing its share of the computation.

BACKGROUND OF THE INVENTION

As is known, when a program written in a data-parallel language, such as Fortran 90, is compiled to run on a computer having a distributed memory parallel processor architecture, aggregate data objects, such as arrays, are distributed across the processor memories. This mapping determines the amount of residual communication that is required to bring operands of parallel operations into alignment with each other.

Languages such as Fortran D and High Performance Fortran permit programs to be annotated with alignment and distribution statements that specify the desired decomposition of arrays across the individual processors of computers of the foregoing type. Thus, arrays and other aggregate data objects commonly are mapped onto the processors of these computers in two stages: first, an "alignment" phase that maps all the array objects to an abstract template in a Cartesian index space, and then a "distribution" phase that maps the template to the processors. The alignment phase positions all array objects in the program with respect to each other so as to reduce realignment communication cost. The distribution phase, in turn, distributes the template aligned objects to the processors. This two-phase mapping effectively separates the language issues from the machine issues because the alignment of the data objects is machine independent. A copending United States patent application of Gilbert et al, which was filed Aug. 11, 1993 under U.S. Ser. No. 08/104,755 on "Mobile and Replicated Alignments of Arrays in Data Parallel Programs" deals with the alignment issues, so it is hereby incorporated by reference.

Compilers for distributed memory applications of programs written in these data parallel languages are required to partition arrays and to produce "node code" that is suitable for execution on a computer having a distributed memory, parallel processor architecture. For example, consider an array A of size N that is aligned to a template T such that array element A(i) is aligned to template cell ai+b. The notational shorthand that this example brings into play is as follows:

A a distributed array
N size of array A
a stride of alignment of A to the template
b offset of alignment of A to the template
p number of processors to which the template is distributed
k block size of distribution of the template
l lower bound of regular section of A
h upper bound of regular section of A
s stride of regular section of A
m processor number Now, let template T be distributed across p processors using a cyclic(k) distribution, so template cell i is held by processor (i div k) mod p. This means that array A is split into p local arrays residing in the local memories of the respective processors. Consequently, if a zero-based indexing scheme is used so that array elements, template cells, and processors are numbered starting from zero, a computation involving the regular section A(l:h:s) can be viewed as involving the set of array elements $\{A(l+js):0 \leq j \leq (h-l)/s\}$, where $s>0$.

Among the issues that must be addressed for effective node code generation by compilers for such data parallel programs are: (1) the sequence of local memory addresses that a given processor m must access while performing its share of the computation, and (2) the set of messages that a given processor m must send while performing its share of the computation.

As will be apparent, cyclic(k) distributions of templates generalize the familiar block and cyclic distributions which are cyclic(n/p) and cyclic(1), respectively. Thus, it is to be understood that there is reason to believe that the generalization may be important. For instance, it has been suggested that generalized cyclic(k) distributions may be essential for efficient dense matrix algorithms on distributed-memory machines (see Dongarra et al., "A Look at Scalable Dense Linear Algebra Libraries," *Proc. of the Scalable High Performance Computer Conference*, IEEE Computer Society Press, April 1992, pp. 372-379; also available as technical report ORNL/TM-12126 from OakRidge National Laboratory). Indeed, the importance of these generalized cyclic(k) distributions is recognized by High Performance Fortran because it includes directives for multidimensional cyclic(k) distribution of templates.

Others have proposed techniques for generating node code for the block and cyclic mappings of regular sections of arrays. A solution for the case where the regular section has unit stride was proposed by Koelbel and Mehrotra "Compiling Global Name-Space Parallel Loops for Distributed Execution," *IEEE Transactions on Parallel and Distributed Systems*, Vol. 2, No. 4, Oct. 1991, pp. 440–451. Koelbel, "Compile Time Generation of Regular Communication Patterns," in *Proceedings of Supercomputing '91*, Albuquerque, NM, Nov. 1991, pp. 101-110 deals with regular sections having non-unit-stride. MacDonald et al., "Addressing in Cray Research's MPP Fortran," in *Proceedings of the Third Workshop on Compilers for Parallel Computers*, (Vienna, Austria, July 1992), Austrian Center for Parallel Computation, pp. 161-172 discuss cyclic(k) distributions in the context of Cray Research's MPP Fortran, but they concluded that a general solution requires unacceptable address computation overhead in inner loops. Accordingly, they restrict block sizes and number of processors to powers of two, thereby allowing the use of bit manipulation in address computation. Thus, there still is a need for an efficient process for generating the local memory addresses and the communication sets (i.e., the node code) that enable computers having distributed memory, parallel processor architectures to handle generalized cyclic(k) distributions of arrays.

SUMMARY OF THE INVENTION

This invention provides an optimizing compilation process for generating executable code for the computation and communication actions to be taken by each individual processor of a computer having a distributed memory, parallel processor architecture, from a program written in a data-parallel language. To this end, local memory layouts of the one-dimensional and multidimensional arrays that are used in the program are derived from one-level and two-level data mappings consisting of alignment and distribution, so that array elements are laid out in canonical order and local memory space is conserved. Executable code then is generated to produce at program run time, a set of tables for each individual processor for each computation requiring access to a regular section of an array, so that the entries of the tables specify the spacing between successive elements of said regular section resident in the local memory of said processor, and so that all the elements of said regular section can be located in a single pass through local memory using said tables. Additional executable code is generated to produce at program run time, another set of tables for each individual processor for each communication action requiring a given processor to transfer array data to another processor, so that the entries of these tables specify the identity of a destination processor to which the array data must be transferred and the location in said destination processor's local memory at which the array data must be stored, and so that all of said array data can be located in a single pass through local memory using these tables. And, executable node code is generated for each individual processor that uses the foregoing tables at program run time to perform the necessary computation and communication actions on each individual processor of the parallel computer.

BRIEF DESCRIPTION OF THE DRAWINGS

Additional features and advantages of this invention will become apparent when the following detailed description is read in conjunction with the attached drawings, in which:

FIG. 4 illustrates the layout parameters for a one-level mapping of an array;

FIG. 5 illustrates a one-level layout of array elements in the local processor memories;

FIG. 6 illustrates a one-level distribution of template cells to processors for $k=4$, $p=4$, $s=3$;

FIG. 9 illustrates a one-level distribution of template cells to processors for $k=4$, $p=3$, $s=3$;

FIG. 12 illustrates a one-level distribution of template cells to processors for $k=4$, $p=3$, $s=5$;

FIG. 15 is an algorithm for computing memory access sequences for one-level mappings of data arrays;

FIG. 16 is a simple Fortran 90/HPF program that includes alignment and distribution directives for a two-level mapping of an array;

FIG. 17 shows the template aligned array A that is specified by the program set forth in FIG. 16, together with the distribution of the template cells to the processors of the computer shown in FIG. 1;

FIG. 18 illustrates the local memory layout of the array A of FIG. 16;

FIG. 19 illustrates the local template space for the array A of FIG. 16;

FIG. 22 is an algorithm for computing memory access sequences for two-level mappings of data arrays;

FIG. 23 shows the node code for the memory address sequence that is generated for one of the processors of the computer shown in FIG. 1 by decomposing the program set forth in FIG., 16 in accordance with the algorithm shown in FIG. 22;

FIG. 24 illustrates a mapping of a two-dimensional array; and

FIG. 25 is an algorithm for computing memory access sequences for two-level mappings of multidimensional arrays;

DETAILED DESCRIPTION OF THE ILLUSTRATED EMBODIMENT

While the invention is described in some detail hereinbelow with specific reference to an illustrated embodiment, it is to be understood that there is no intent to limit it to that embodiment. On the contrary, the aim is to cover all modifications, alternatives and equivalents falling within the spirit and scope of the invention as defined by the appended claims.

The disclosure is organized as follows. Section 1 provides a basic overview. Section 2 deals with the compilation of one-level mappings (i.e., $a=1$, $b=0$). Section 3 then describes how the problem for two-level mappings can be reduced to combining the solutions from two subproblems involving one-level mappings. Section 4 extends this framework to handle multidimensional arrays, and Section 5 then further extends it to handle the generation of communication sets.

1.0 Overview

Figure 1:
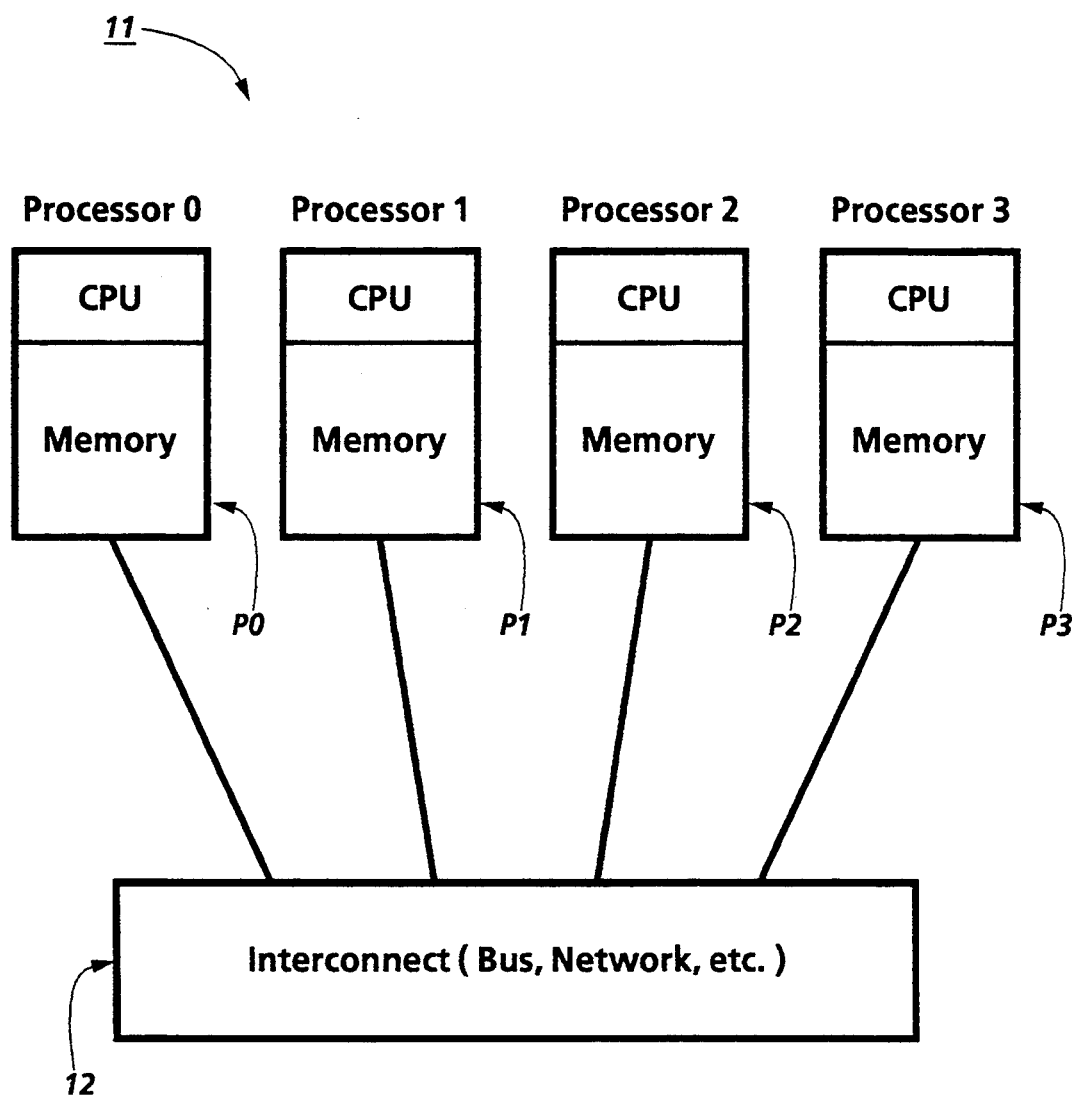
FIG. 1 is a simplified schematic diagram of a computer having a distributed memory parallel processor architecture.

Turning now to the drawings, and at this point especially to FIG. 1, there is a computer 11 which has a parallel processor, distributed memory architecture. Thus, each of the processors, P0–P3, includes a central processing unit (CPU) and local memory. Moreover, the processors P0–P3 are interconnected, as at 12, to communicate with each other via a bus, a network, or any other suitable interconnect medium.

Figure 2:
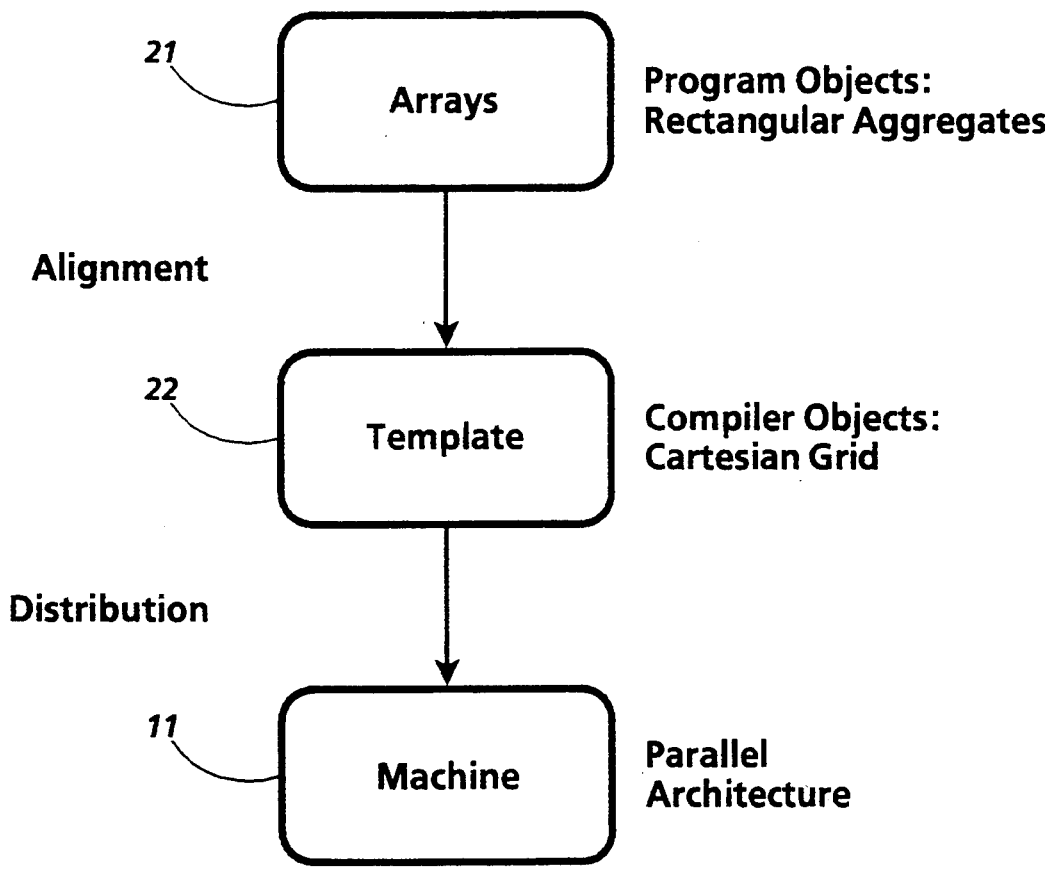
FIG. 2 schematically illustrates a standard two-phase compiler model for mapping program objects that are expressed in array-parallel languages onto the individual processors of a computer of the type shown in FIG. 1.

As previously pointed out, some data-parallel languages permit programs to be annotated with alignment and distribution statements that specify the desired decomposition of arrays across the individual processors P0–P3 of the computer 11. Therefore, as shown in FIG. 2, data arrays 21 and other aggregate data objects advantageously are mapped onto the processors of a computer of this type in two stages: first, an "alignment" phase that maps all the array objects to an abstract template 22 in a Cartesian index space, and then a "distribution" phase that maps the template 22 to the processors P0–P3. More particularly, "alignment" is a mapping that takes each element of a given data array A to a cell of a template 22. The template 22 is a conceptually infinite Cartesian grid because it has as many dimensions as the highest-dimensional array object in the program. In effect, each dimension of the template 22 can be represented by a piece of "graph paper" on which all the array objects in a program are positioned relative to each other. Thus, the alignment phase of the compilation process aligns all the array objects 21 of the program to the template 22. The distribution phase, in turn, assigns the individual cells of the template 22 to the actual processors P0–P3 of a targeted machine 11 (FIG. 1).

Figure 3:
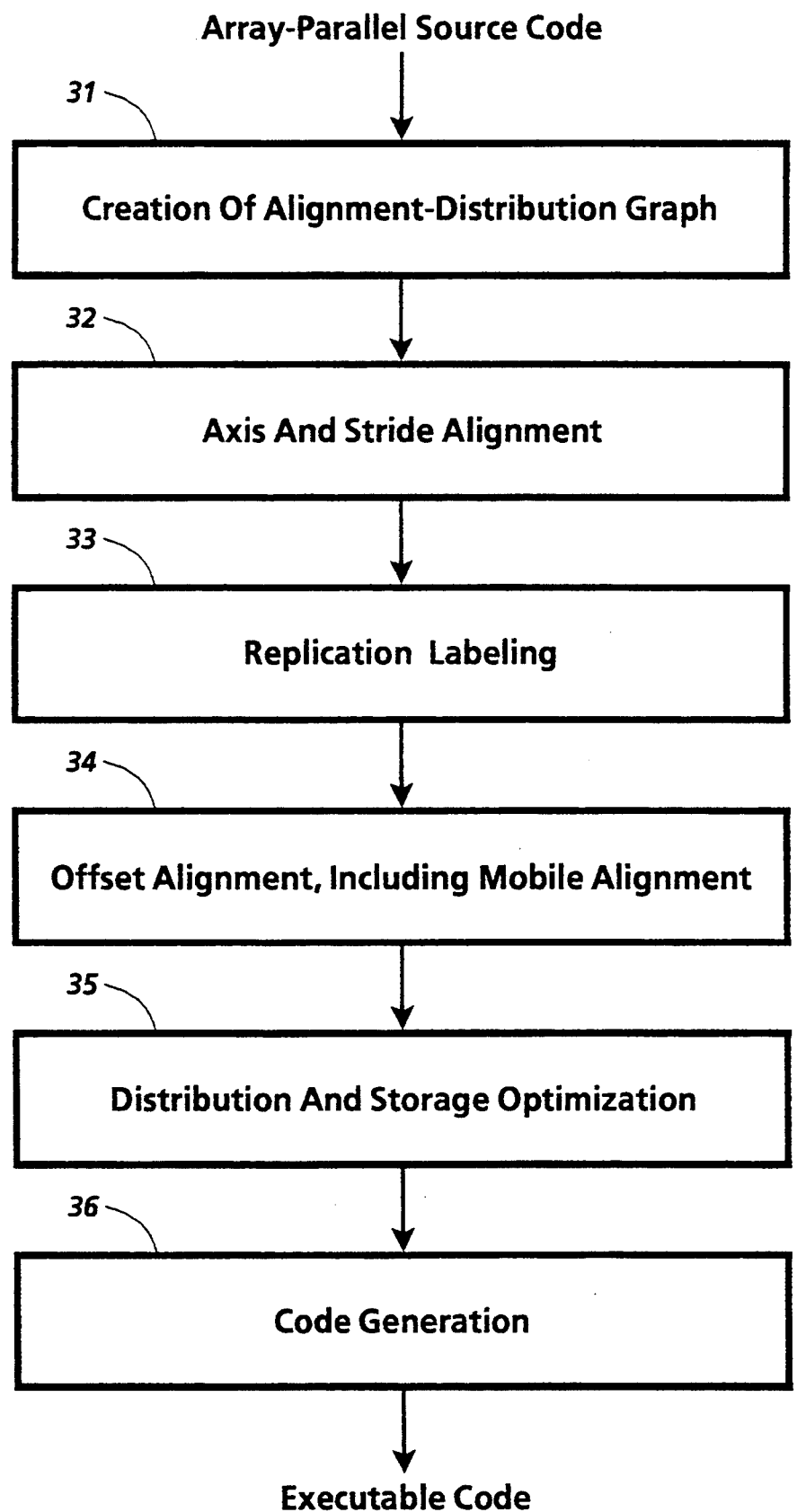
FIG. 3 identifies the usual sequence of steps that a compiler conforming to the model shown in FIG. 2 performs while compiling a program written in an array-parallel language for execution by a computer of the type shown in FIG. 1.

Referring to FIG. 3, it will be seen that the compilation process suitably involves a series of steps. First, an alignment distribution graph (ADG) of the source program is generated as at 31. The data objects then have their axes and stride aligned with the axes and stride of the template 22 simultaneously for all axis as at 32. Next, a decision is made at 33 as to whether each port of the ADG should be identified as being replicated or non-replicated on one after another of the axes of the template 22. This often results in a simplification of the ADG because every edge that has a replicated endpoint can be discarded for reasons that are more fully described in the above referenced Gilbert et al patent application. This replication labeling step 33 minimizes the cost of broadcast communication during program execution. It is not necessary to determine the extent of any replication that is found during this phase of the compilation process. Instead, the extents of the replicated alignments can be generated during the subsequent storage optimization phase (see step 35). Following the replication labeling, offset alignments (including any mobile alignments) are determined for one after another of the axes of the template 22. Subsequently, as indicated at 35, the template aligned data objects are distributed in accordance with the distribution of the processors P0–P3 for optimum storage. Finally, a code generation step 36 generates the executable "node code" for the processors P0–P3. This code generation step 36 is the subject of this invention.

2.0 One-Level Mappings

Focusing first on a one-dimensional array A that is aligned to a template 22 with a=1 and b=0. This is called a one-level mapping. In this case, the array A and the template 22 are in one-to-one correspondence, and the distribution of the template 22 across the processors P0–P3 (FIG. 1) is specified by the pair (p,k). As shown in FIG. 4, the layout of the array A in the processor memories can be visualized as courses of blocks. Three functions P, C, and O describe the location of array element A(i). Specifically, $P(i;p,k)$ is the processor holding $A(i)$, $C(i;p,k)$ is the course of blocks within this processor holding $A(i)$, and $O(i;p,k)$ is the offset of $A(i)$ within the course. A one-level layout of array elements in the local processor memories is as shown in FIG. 5.

More particularly, the functions P, C, and O are defined as follows.

$$P(i;p,k) = (i \bmod pk) \operatorname{div} k = (i \operatorname{div} k) \bmod p \tag{1}$$

$$C(i;p,k) = i \operatorname{div} pk = (i \operatorname{div} k) \operatorname{div} p \tag{2}$$

$$O(i;p,k) = i \bmod k \tag{3}$$

Thus $$i = pk \cdot C(i;p,k) + k \cdot P(i;p,k) + O(i;p,k).$$

The local memory location (with respect to the base of the local array) where element A(i) is stored within processor P(i;p,k) is given by:

$$M(i;p,k) = k \cdot C(i;p,k) + O(i;p,k). \tag{4}$$

The goal, of course, is to identify the sequence of local memory locations that an individual processor, numbered m, accesses while performing its share of the computation on the regular section $A(l:h:s)$ of the array A. This sequence of accesses suitably is specified by its starting location and by the differences $\Delta M(i_1,i_2) = M(i_2;p,k) - M(i_1;p,k)$, where $i_1$ and $i_2$ are two successive indices of the part of the regular section mapped to processor m. As the following examples illustrate, the spacing $\Delta M$ is not constant.

A key insight is that (for a particular p, k, and stride s) the offset $O(i_1;p,k)$ of one element of the regular section determines the offset $O(i_2;p,k)$ of the next element of the regular section in the same processor, and also determines the spacing $\Delta M(i_1,i_2)$. Accordingly, the offset sequence and the $\Delta M$ sequence can be represented as a simple table indexed by offset. This table, in turn, can be visualized as the transition diagram of a finite state machine (FSM) whose k states are the offsets. It just so happens that this FSM is particularly simple because it has no input, and each state has only one outgoing transition Indeed, the FSM is just a union of state-disjoint cycles. Thus the sequence of $\Delta M$'s is periodic, with period at most k.

The contents of the table (or, in other words, the transitions of the FSM) depend on p, k, and s, but not on the section bounds l and h or the processor number m. This means that the same FSM describes the offsets for every processor, though each processor sees at most one cycle of the FSM. The first memory location used by the section in processor m (and its offset, which is the "start state" for that processor's view of the FSM) depends on l and m as well as p, k, and s.

From Equation (4) it will be evident that $\Delta M$ can be expressed in terms of the differences in course and offset:

$$\Delta M(i_1,i_2) = k \cdot \Delta C(i_1,i_2) + \Delta O(i_1,i_2), \tag{5}$$

where the definitions of $\Delta C$ and $\Delta O$ are analogous to that of $\Delta M$. Some examples will make the foregoing more concrete. Initially, it will be assumed that l=0 and that h is large.

EXAMPLE 1

Figures 7, 8:
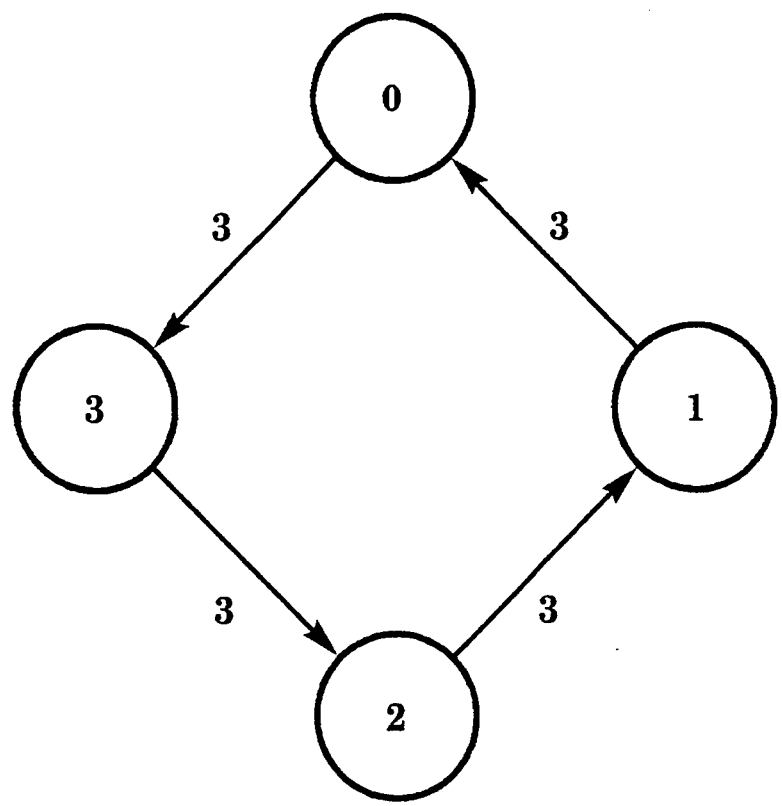
FIG. 7 is a state transition table for a one-level distribution where $k=4$, $p=4$, $s=3$.
FIG. 8 is a FSM that corresponds to the transition table shown in FIG. 7.

If k=4, p=4, s=3, the distribution of the template cells to the processors is as shown in FIG. 6, and the transition table T is as shown in FIG. 7 (as will be seen, $\Delta C$ and $\Delta O$ have also been calculated for convenience).

In this case, all of the processors access local memory with constant stride (see the FSM of FIG. 8).

EXAMPLE 2

Figures 10, 11:
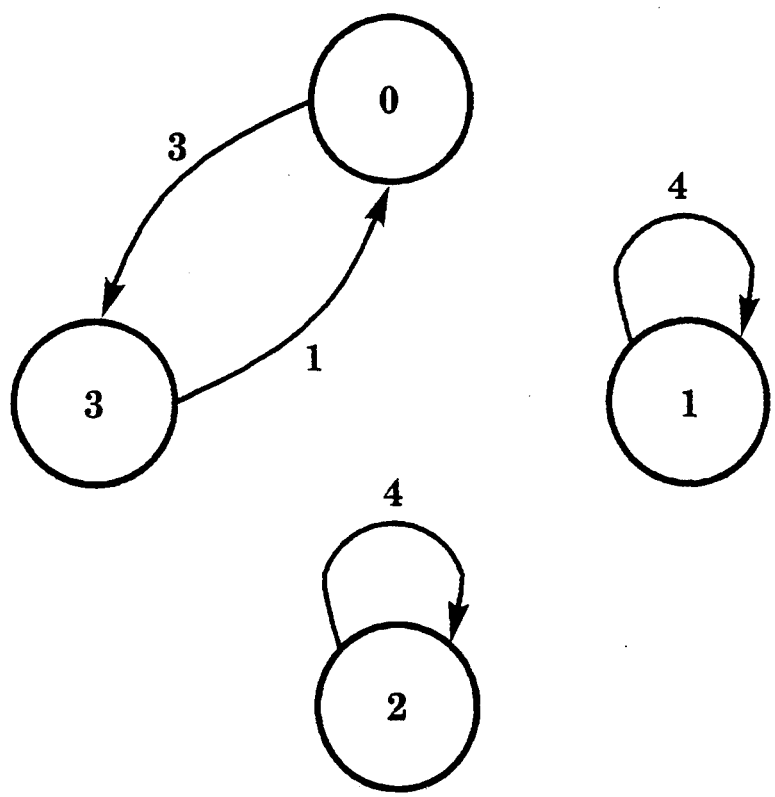
FIG. 10 is a state transition table for a one-level distribution where $k=4$, $p=3$, $s=3$.
FIG. 11 is a FSM that corresponds to the transition table shown in FIG. 10.

Alternatively, if k=4, p=3, s=3, the distribution of the template cells to the processors is as shown in FIG. 9, and the transition table T is as shown in FIG. 10. This, in turn, means that the FSM for this case (FIG. 11) is composed of disjoint cycles. Consequently it is to be understood that each processor experiences at most one cycle of the FSM depending on its start state.

EXAMPLE 3

Figures 13, 14:
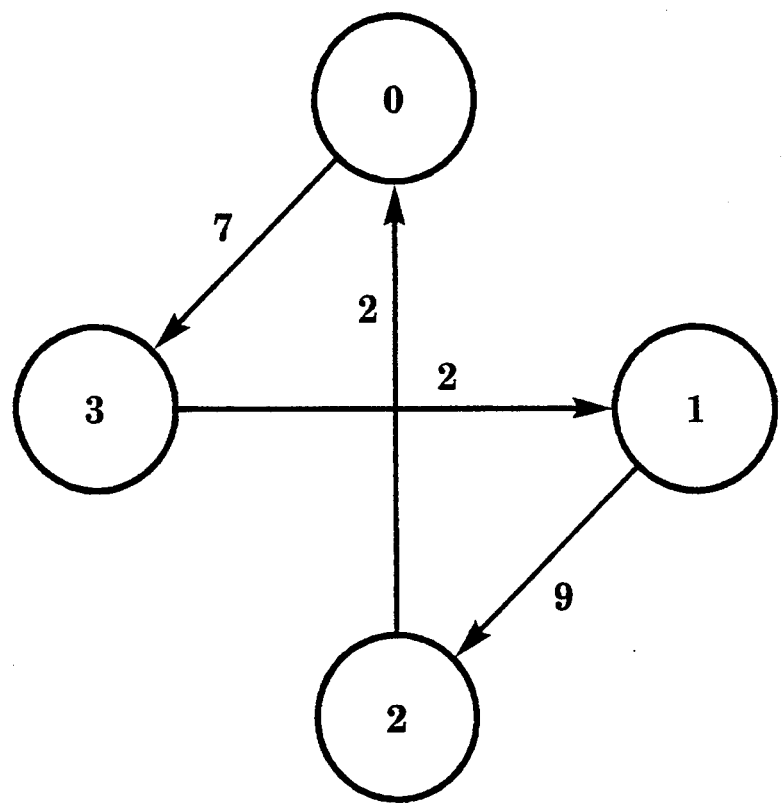
FIG. 13 is a state transition table for a one-level distribution where $k=4$, $p=3$, $s=5$.
FIG. 14 is a FSM that corresponds to the transition table shown in FIG. 13.

Or, if k=4, p=3, s=5, the distribution is as shown in FIG. 12, and the transition table T is as shown in FIG. 13. The FSM, in turn, is as shown in FIG. 14. In this case, the $\Delta M$ sequence has period k, and local memory accesses vary in stride.

2.1 An Algorithm for Generating the Node Code for One-Level Mappings

Prior to finding a processor's $\Delta M$ sequence, the starting memory location for the processor is identified. To accomplish this given a processor number m, a regular section A(l:h:s), and layout parameters p and k, it is necessary to find the first element (if any) of the regular section that resides on that processor. This is equivalent to finding the smallest nonnegative integer j such that $P(l+sj;p, k)=m$.

Substituting the definition of P from Equation (1) yields $$((l+sj) \bmod pk) \operatorname{div} k = m.$$

This reduces to $$km \leq (l+sj) \bmod pk \leq k(m+1) - 1$$

which is equivalent to finding an integer q such that $$km - l \leq sj - pkq \leq km - l + k - 1. \quad (6)$$

Inequality (6) can be rewritten as a set of k linear Diophantine equations in the variables j and q, $$\{sj - pkq = \lambda : km - l \leq \lambda \leq km - l + k - 1. \quad (7)$$

The equations in this set are to be solved independently (rather than simultaneously). Thus, solutions exist for an individual equation if and only if $\lambda$ is divisible by GCD (s,pk).

More particularly, the general solution to the linear Diophantine equation $sj - pkq = \lambda$ is found by letting $d = \text{GCD}(s, pk) = \alpha s + \beta pk$, with $\alpha, \beta \in Z$. The quantities $\alpha$, $\beta$, and d are determined by the extended Euclid algorithm (see Knuth, *Seminumerical Computing*, Vol. 2 of the Art of Computer Programing (Second Edition), Addison Wesley Publishing Co., Reading, Mass., p. 325). Thus, it follows that the general solution of the Set of Equations (7) is the one-parameter family $j = (\lambda \alpha + p \cdot ky)/d$ and $q = (-\lambda \beta + sy)/d$, for $y \in Z$.

For each solvable equation in Set (7), the solution having the smallest nonnegative j is found because the minimum of these solutions gives the starting index value $l+js$, which is convertible into the starting memory location using equation (4). The ending memory location suitably is computed similarly, by finding the largest solution that is no greater than h for each of the solvable equations in Set (7), and by then taking the maximum among these solutions.

As will be appreciated, the foregoing process can be extended to build the $\Delta M$ sequence for any given processor m. A sorted version of the set of smallest positive solutions for the Set of Equations (7) as determined above defines the sequence of indices that will be successively accessed by the processor. Therefore, a linear scan through this sequence is sufficient to generate the $\Delta M$ sequence for the cycle of the FSM that is visible to the given processor m. If the FSM has multiple cycles, the local $\Delta M$ sequences may be different for different processors. Otherwise, however, the sequences are cyclic shifts of one another. To avoid following the NEXT pointers at runtime, the $\Delta M$ table that is computed contains the memory spacings in the order seen by the processor m.

The algorithm set forth in FIG. 15 ("Algorithm 1") combines the above described principles to provide a technique for generating executable node code that cause the processors P0–P3 to carry out the local memory access sequences for one-level data mappings. The running time of Algorithm 1 is $O(\log \min(s,pk)) + O(k \log k)$, which reduces to $O(\min(k \log k + \log s, k \log k + \log p))$. Being that the output can be of size k in the worst case, any algorithm for this problem takes $\Omega(k)$ time. Moreover, this implementation recognizes the following special cases that can be handled more quickly: p=1, s divides k, k=1, pk divides s, a single course of blocks, and s divides pk.

Algorithm I can be simplified by noting that the right hand sides of successive solvable equations differ by d, and that the identity of the first solvable equation is easily determined from the value of (km-l) mod d. This removes the conditional from the loop in lines 5–12. Similar incremental computations can also be used to simplify the floor and ceiling computations in that loop.

The node code for each processor is defined by the following loop:

```
base←startmem; i←0
while (base ≤ lastmem) do
    compute with address base
    base←base + ΔM[i]
    i←(i + 1)mod length
end do
```

Briefly reviewing the actions of Algorithm 1 (FIG. 15) on Example 3 above (FIGS. 12–14) as applied to processor P0, it will be recalled that in this particular case p=3, k=4, and s=5. Thus, the extended Euclid algorithm returns d=1, $\alpha=5$, and $\beta=-2$. Now, since each linear Diophantine equation is solvable, the loop in lines 5–12 of Algorithm 1 is executed four times. At the end of this first loop, loc=[0, 25, 50, 15], length=4, start=0, and end=50. After line 17, sorted=[0, 15, 25, 50, 60]. And, at the end of the loop in lines 18–22, $\Delta M = [7, 2, 9, 2]$.

3.0 Two-Level Mappings

Two-level mappings are solved by two applications of Algorithm 1. In keeping with the simple program set forth in FIG. 16, let A be an array with element A(i) aligned with template cell 3i, let the template be mapped with p=k=4, and let the regular section be A(0:42:3), which will be abbreviated to "B." The layout of the template cells for the two-level mapping of this array A is shown in FIG. 17, where the numbers are array elements and the boxed numbers are in the regular section A(0: 42: 3). The local memory storage layout for this example is shown in FIG. 18, and the local template space layout is shown in FIG. 19. As will be understood, two-level mappings encompass all mappings possible with the linguistic constructs of nested sections, affine alignment, and cyclic(k) distribution.

Unlike the one-level case, all template cells do not contain array elements. However, as shown in FIG. 18, local storage is allocated only for the occupied cells of the template. To this end, the computations are first performed with respect to the "local template" space of FIG. 19, and then with respect to the "local memory space" of FIG. 18.

Note that A and B are both aligned to "regular sections" of the template: A(i) is aligned to template cell 3i, and B(i) is aligned to template cell 9i. Therefore state tables are created for A (FIG. 20) and B (FIG. 21) with respect to the local template space using Algorithm 1. The "$\Delta M$" entries returned by the algorithm are actually spacings in local template space; so this column has been renamed $\Delta T$.

Now, the only further action that needs to be taken is to switch back to local memory space and fill in the $\Delta M$ entries. While traversing the state table $T_A$ for any processor m, each element of A that is stored on that processor is accessed in order. But since storage is allocated based on the regular section A, this translates to accessing consecutive locations in local memory. Thus, the $\Delta M$ entries for $T_A$ are all unity. Given the $\Delta M$ entries for $T_A$ it is a simple matter to find the $\Delta M$ entries for the desired section B. For instance, the first line of $T_B$ (FIG.21) says that if the starting memory location is an element of the section that has offset 0, the next element has offset 2 and is 6 template cells away. Accordingly, to find the corresponding $\Delta M$, the process starts in state 0 of $T_A$, and then walks the state table, accumulating $\Delta T$ and $\Delta M$ counts. This process stops when the desired $\Delta T$ count has been accumulated. (It is easy to show that at this point we will have arrived at the correct offset as well.) The accumulated $\Delta M$ value is the desired entry for that line of $T_B$. This procedure results in the transition table shown in FIG. 21

Figure 20:
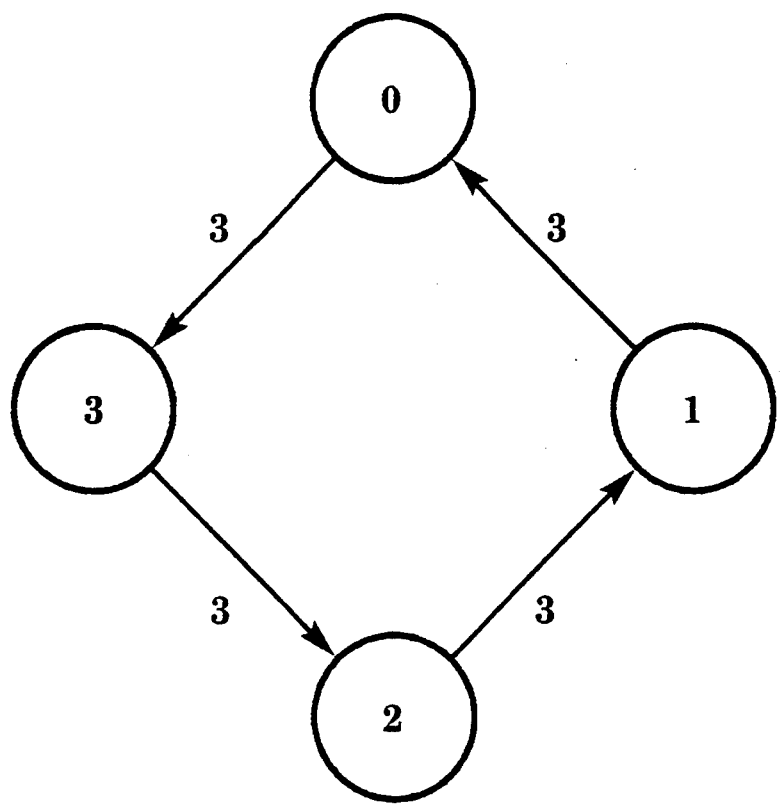
FIG. 20 shows the transition table relative to the template space for the array A of FIG. 16, together with the corresponding FSM.
Figure 21:
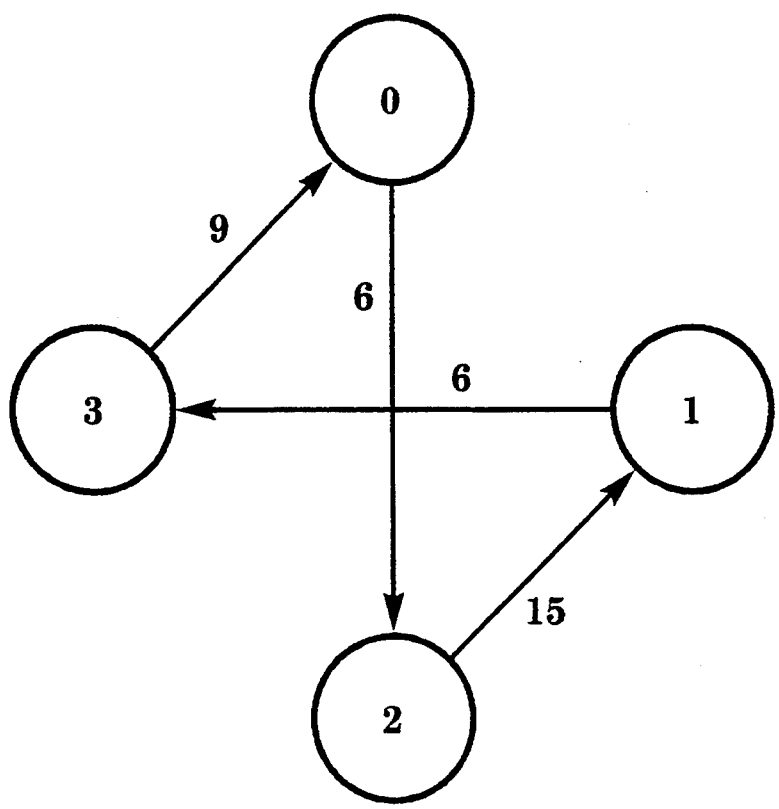
FIG. 21 shows the transition table relative to the template space for the regular section array A(0: 42: 3) that is specified by the program of FIG. 16, together with the corresponding FSM.

The algorithm as presented above requires $O(k)$ time to compute each $\Delta M$ entry of $T_B$. Two optimizations reduce this complexity to $O(1)$, allowing the final fixup phase to run in $O(k)$ time. The first of these optimizations is based on computing the sum of the $\Delta T$ and the $\Delta M$ around the state machine cycle, so that any full cycles that must be traversed can be cast out. Secondly, the distance of each offset from a fixed origin is tabulated (the "numarcs" table in Algorithm 2 as set forth in FIG. 22), allowing the computation of the distance between any two offset positions by two table lookups and some simple arithmetic. Consider the third line of $T_B$(FIG. 21), which has a $\Delta T$ of 15. Using the precomputed sums, it can be determined in constant time that this corresponds to one full cycle plus 3 more template cells, and that the full cycle contributes a memory offset of 4. Then, all that is needed is to determine the number of memory cells encountered in going from offset position 2 to offset position 1 in $T_A$ (FIG. 20). This distance is found in constant time using the numarcs table of Algorithm 2 (FIG. 22).

FIG. 23 shows the executable node code which is generated for processor P3 of the computer 11 (FIG. 1) by using Algorithm 2 (FIG. 22) to compute the local memory address sequences that it requires to perform its share of the runtime computation that is called for by the program shown in FIG. 16. As will be appreciated, each of the processors P0–P3 executes the same node code while performing a given data-parallel computation, but the processors employ different values for the constants startmem, lastmem, length, and $\Delta M$.

4.0 Multidimensional Arrays

So far, the access sequence of a single processor has been characterized by a start address and a memory stride pattern, the latter being generated by the transitions of a FSM. For a multidimensional array, each dimension is characterized by a (p,k) pair and has a FSM associated with it, and each processor executes a set of nested loops. Instead of the start address being fixed as it was before, it too is generated by the transitions of a FSM. For simplicity, this concept will be illustrated hereinafter with a two-dimensional array. It will be understood, however, that the extension to higher dimensions is straightforward. In this connection it is to be noted that an array dimension with $p=1$ is "mapped to memory". Consider a one-level mapping of an array A(0:I 7,0:7) with parameters $(p_1, k_1)=(3,3)$ in the first dimension and $(p_2,k_2)=(2,2)$ in the second dimension, and let the section of interest be A(0:17:2,0:7:3). See FIG. 24, where the boxed pairs are elements of the section A(0:17:2,0:7:3).

Now, let each block be laid out in column-major order in local memory. Thus, the sequence of index values corresponding to successive memory elements of processor (0,0) is {(0,0), (1,0), (2,0), (9,0), (10,0), (11,0), (0,1), ... }. Such a decomposition is used by Dongarra et al. supra for dense linear algebra codes on distributed-memory machines. The tables corresponding to the two dimensions of A are

|       | STATE | NEXT | $\Delta M$ |
|-------|-------|------|------------|
| $T_1=$ | 0 | 2 | 2 |
|       | 1 | 0 | 2 |
|       | 2 | 1 | 2 | and

|       | STATE | NEXT | $\Delta M$ |
|-------|-------|------|------------|
| $T_2=$ | 0 | 1 | 30 |
|       | 1 | 0 | 6 |

In passing it should be noted that had the section been larger in the second dimension, the column accessed by processor (0,0) immediately after column 0 would be column 9. In that event, the elements (0,0) and (0,9) would be 30 locations apart in local memory. This explains the $\Delta M$ entry in the first row of $T_2$ above.

The FSM $T_2$ is used to generate memory spacings for successive base addresses, while the FSM $T_1$ is used to generate memory spacings between successive elements with the same base address. Algorithm 3, which is set forth in FIG. 25, computes these FSMs.

For the two-dimensional case, each processor executes the following doubly-nested loop. Higher-dimensional cases follow the same pattern, with one additional loop for each dimension. Thus, the node code for this multidimensional case is:

```
base₂←startmem₂
i₂←0
while base₂ ≤ lastmem₂ do
    base₁←startmem₁
    i₁←0
    while base₁ ≤ lastmem₁ do
        compute with address base₂ + base₁
        base₁←base₁ + ΔM₁[i₁]
```

```
-continued
  i₁←(i₁ + 1) mod length₁
 end do
 base₂←base₂ + ΔM₂[i₂]
 i₂←(i₂ + 1) mod length₂
end do
```

5.0 Generating Communication Sets

The set of messages that a given processor m must send while performing its share of the computation is called its "communication set." It has been found that the above-described FSM approach can be extended to generate communication sets for regular communication patterns such as shifts and stride changes. This will be described in the context of a one-dimensional array with a single-level mapping, but the extensions to multi-level and multidimensional cases are similar to those that apply to the address generation problem.

To generate the communication sets, Koelbel's execution model for parallel loops is adopted (see Koelbel, supra), in which a processor goes through four steps:

1. Send those data items it holds that are required by other processors.
2. Perform local iterations, i.e., iterations for which it holds all data.
3. Receive data items from other processors.
4. Perform nonlocal iterations.

As will be seen, steps 3 and 4 of this model suitably are combined into a receive-execute loop.

Advantageously, all the intelligence is located on the sending side, thereby keeping the receive-execute loop simple. Further, steps are taken to minimize the number of messages sent and to maximize cache benefits. To this end, each processor makes a single pass over the data in its local memory using the FSM technique described above, figuring out the destination of each data element and building messages. These messages contain (address, value) pairs which the receiving processor uses to perform its computations. All the data that must go from processor i to processor j are communicated in a single message. The data items corresponding to the local iterations are are performed out of the message buffer (conceptually, this is equivalent to the local processor sending those messages to itself,).

5.1 Shifts

Consider the computation $$A(0:h:s) = A(0:h:s) + A(l:l+h:s),$$

where the regular section $A(l:l+h:s)$ is to be moved to align with $A(0:h:s)$. (For simplicity, assume $l>0$.) In this case, a processor communicates with at most two processors. The following describes how to augment the FSM with a $\Delta P$ and a $\Delta L$ column, such that adding these quantities to the processor and memory location of the current element gives the remote processor number and the memory location in the remote processor of the element with which it interacts.

Suppose it is known that element $A(i)$ is located on processor m at memory location $M(i;p,k)$ with offset $O_i = O(i;p,k)$. Then, the problem is to find the processor and local memory location of the element $A(i-l)$. Let $l = q \cdot pk + r$, and $\Delta P = \lceil (r-O_i)/k \rceil$. Then $P(i-l;p,k) = (m - \Delta P + p) \mod p$. Since $0 \leq O_i < k$, $\Delta P$ can assume only two values as the offset $O_i$ varies. On the other hand, the quantity $\Delta L$ can be defined such that $M(i-l;p,k) = M(i;p,k) + \Delta L(O_i)$.

$$\Delta L(O_i) = ((O_i - r) \mod k) - O_i - kq - \eta,$$

$$\eta = \begin{cases} k & \text{if } (mk - r + O_i) < 0, \\ 0 & \text{otherwise.} \end{cases}$$

5.2 Stride Changes

Now consider the communication required to move the regular section $A(0:s_2\ n:s_2)$ to align with the regular section $A(0:s_1\ n:s_1)$. This is harder than a shift because there is no simple lookup technique for generating the communication sets. The problem is that the pattern of destination processors can have period longer than k. The only fact that appears to be true in this case is that the sum of the periods over all processors divides pk. This invention, therefore, resorts to a simple technique.

Specifically, the FSM that reflects the storage properties of the $s_2$-section is generated. Thus, the $j^{th}$ element of this section interacts with index $i = j \cdot s_1$ of A. Let $q_1 = i$ div pk, $r_1 = i$ mod pk, $q_2 = r_1$ div k, and $r_2 = r_1$ mod k. Then the desired element is stored in memory location $q_1 \cdot k + r_2$ on processor $q_2$.

Many modern RISC microprocessors perform integer division and remainder operations in software, which are rather slow. The equations above can be rewritten to require only two integer divisions, which substantially speeds up the implementation. If either p or k is a power of two, the computation can be sped up further by using shifts and bit masks instead of the division operations. Our implementation incorporates these optimizations.

5.3 Termination

Each processor must determine when it has completed all its operations. Since messages are not necessarily sent between every pair of processors, the number of messages sent is not a reliable termination control function. However, it is easy to figure out the total number of operations that any given processor m will execute (by a variant of Algorithm 1). Thus, a simple termination test initializes a counter to this value, decrements it by the number of array elements received in each message, and exits when the counter reaches zero.

CONCLUSION

In view of the foregoing, it will now be evident that the present invention provides a table-driven approach for generating local memory addresses and communication sets (i.e., the "node code") that determine the computation and communication actions that are taken by each individual processor of a computer having a distributed memory, parallel processor architecture while executing a program written in a data-parallel language. The tables that are required are easy to compute, and the runtime overheads due to indirect addressing of data are small.

Furthermore, it will be apparent that the data access patterns that are employed exploit temporal locality and make effective use of cache. Moreover, blocking of messages is supported to reduce message startup overheads. Our prototype implementation has demonstrated our performance claims.

The algorithms that have been developed to carry out this invention are fully parallel in that each processor of a parallel machine can generate its tables independently.

What is claimed:

1. An optimizing compilation process for generating executable code for the computation and communication actions to be taken by individual processors of a computer having a distributed memory, parallel processor architecture, from a program written in a data-parallel language, said distributed memory including local memories for the individual processors said compilation process comprising the steps of:

laying out arrays used in said program in said local memories of the individual processors so that array elements are laid out in canonical order and local memory space is conserved;

generating a first set of tables for each individual processor for each computation requiring access to a regular section of an array, said tables containing entries specifying the spacing between successive elements of said regular section resident in the local memory of said processor and so that all the elements of said regular section can be located in a single pass through local memory using said tables;

generating a second set of tables for each individual processor for each communication action requiring said processor to transfer array data to another processor, so that the entries of the tables specify the identity of a destination processor to which said array data must be transferred and the location in said destination processor's local memory at which said array data must be stored, and so that all of said array data can be located in a single pass through local memory using said tables; and generating executable code for each individual processor that uses said tables at program run time to perform said computation and communication actions on each individual processor of the parallel computer.

2. A process for causing each processor of a computer having a parallel processor distributed memory architecture to computationally share in the execution of programs written in a data-parallel language, said distributed memory architecture including local memory for each processor said process comprising the steps of providing a first set of tables for each individual processor for each computation requiring access to a regular section of an array, said first set of tables containing entries specifying a spacing between successive elements of said regular section resident in the local memory of said processor so that all the elements of said regular section can be located in a single pass through local memory using said first set of tables;

providing a second set of tables for each individual processor for each communication action requiring said processor to transfer array data to another processor, so that the entries of the second set of tables specify the identity of a destination processor to which said array data must be transferred and the location in said destination processor's local memory at which said array data must be stored, and so that all of said array data can be located in a single pass through local memory using said second set of tables; and executing code for each individual processor that uses said first set of tables and second set of tables at program run time to perform said computation and communication actions on each individual processor of the parallel computer.

3. The process of claim 1 wherein said data mappings provide an alignment and a distribution for said arrays.

4. The process of claim 2 wherein one-level and full-level data mappings are permitted.

5. The process of any of claim 1, 3 or 4 wherein said first set of tables and said second set of tables are produced at program run time from executable code that is generated at program compile time.

* * * * *